Oct. 7, 1952         L. G. GLASSER         2,612,814
DIFFERENTIAL REFRACTOMETER

Filed May 26, 1948         5 Sheets-Sheet 1

INVENTOR.
LEO G. GLASSER
BY
ATTORNEY

Oct. 7, 1952                 L. G. GLASSER                2,612,814

DIFFERENTIAL REFRACTOMETER

Filed May 26, 1948                                          5 Sheets-Sheet 3

INVENTOR.
LEO G. GLASSER
BY
ATTORNEY

Oct. 7, 1952      L. G. GLASSER      2,612,814
DIFFERENTIAL REFRACTOMETER

Filed May 26, 1948      5 Sheets-Sheet 4

INVENTOR.
LEO G. GLASSER
BY
ATTORNEY

Oct. 7, 1952 — L. G. GLASSER — 2,612,814
DIFFERENTIAL REFRACTOMETER
Filed May 26, 1948 — 5 Sheets-Sheet 5

INVENTOR.
LEO G. GLASSER
BY Fred Ross
ATTORNEY

Patented Oct. 7, 1952

2,612,814

UNITED STATES PATENT OFFICE 2,612,814

DIFFERENTIAL REFRACTOMETER

Leo G. Glasser, Wilmington, Del., assignor to E. I. du Pont de Nemours & Company, Wilmington, Del., a corporation of Delaware Application May 26, 1948, Serial No. 29,279

10 Claims. (Cl. 88—14)

This invention relates to differential refractometers and particularly to those devices for the determination of differential refractive index values wherein the precise location of the refracted light beam is determined by electrical-optical means.

It is well known that a beam of light is refracted, or deflected, away from its course, when it passes obliquely from one medium into another medium and this characteristic, depending as it does upon the specific nature of any light transmitting substance, has been utilized as a means of quantitative analysis. The index of refraction ($n$) of a particular substance is a measure of the extent to which an oblique light beam is deflected in its passage through the substance and, when the light enters the substance from the air, is defined as the ratio of the sine $i_{air}$ to the sine $r_m$, where $i$ is the angle of incidence of the light beam as measured from the normal to the surface of the substance and $r_m$ is the angle of refraction for the substance, which is the angle between the normal and the line of the new path taken by the light beam after it has entered the substance.

The value of the refractive index of a substance varies with temperature, a temperature rise in the case of some organic liquids causing a decrease in $n$ to the extent of about $5.5 \times 10^{-4}$ for an increase of 1° C. at temperatures considerably below the boiling points and an even wider variation at higher temperature levels. It is therefore desirable to control the temperature of the sample material rather closely to insure accurate measurements.

The value of the refractive index of a substance is also dependent upon the wave length of the light which is used in the measurement, $n$ for benzene, for example, being 1.49759 when measured with red light of a wave length of 6563 Å. at 20° C., and 1.52487 when measured with violet light of a wave length of 4341 Å. at the same temperature.

The index of refraction characteristic is particularly useful as a means for the determination of the concentration of a specific solute in a solvent. In some cases widely different concentrations of a particular solute in a particular solvent may have identical refractive index characteristics; but if this fact is established by preliminary investigation of the particular solute-solvent system, it is possible to utilize refractive index techniques to measure concentrations over all ranges where no such overlapping occurs. In these analyses a plot of refractive index versus known standard concentrations of the particular material dissolved in the specific solvent employed may be drawn, and any concentration of the same material in the same solvent may be thereafter determined by simply measuring the refractive index and then referring to the concentration-refractive index curve to determine the exact concentration which corresponds to the observed value of refractive index.

The accuracy with which the refractive index characteristic can be determined depends, of course, upon the accuracy of the measurement of the light beam deviation in traversing the medium tested. A high degree of precision in such measurement has been attained in the manual laboratory type refractometer by the use of very accurate scales and associated equipment; however, the visual determination of refractive index values is a relatively slow and tedious operation, and moreover is dependent, in part at least, upon the personal idiosyncracies of the observer. Furthermore, the effects of changes of temperature on refractive index necessitate close control of the sample enviroment if dependable results are to be secured. These and other considerations have limited the useful service of refractometers to the laboratory where specially trained personnel are available to prepare the samples, perform the measurements and record the observed results.

In a great variety of liquid phase chemical manufacturing operations very effective process control may be attained if process material compositions can be continuously evaluated and regulated within preselected limits. The continuous determination of the differential value between the refractive index of the process material and the refractive index of a standard reference material, hereinafter abbreviated $\Delta n$, affords a convenient method for achieving such process control.

A primary object of this invention is to provide a simple, reliable differential refractometer.

Another object of this invention is to provide a differential refractometer employing electrical-optical means for the measurement of light deflection.

Another object of this invention is to provide a differential refractometer capable of continuous measurement of refractive index values.

Another object of this invention is to provide a differential refractometer which automatically determines and records refractive index values.

Another object of this invention is to provide a differential refractometer wherein enviroment temperatures are effectively controlled and inaccuracies arising from temperature variations are avoided.

Another object of this invention is to provide a differential refractometer wherein a relatively wide slit may be employed for the constriction of the measuring light beam.

Further objects of this invention will become apparent upon the development of this description, as illustrated by the attached drawings in which.

Figure 1:
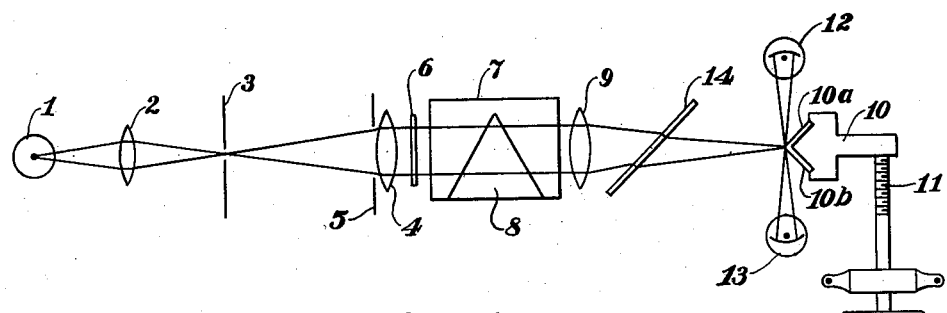
Figure 1 is a diagrammatic representation of the general arrangement of the optical elements and phototubes according to this invention.

The objects of this invention are attained by providing a device which is adapted to continuously determine the differential between the refractive index of the sample material and the refractive index of a standard reference material, and either give an indication of the differential value or record the extent of this difference. If desired, control operations may automatically be initiated by the device to effect changes in the composition of the sample stream, whereupon the difference in refractive index values is restored to substantially zero, and the sample stream is maintained at some preselected composition.

The differential refractometer of this invention may be of two general types, the first null-balancing, wherein the electrical responses to the difference in refractive index are balanced one against the other and the deviation of the light beam at the balance point is suitably indicated and recorded, and the second off-balance measuring, wherein the difference in the electrical responses between the point of zero differential and the existing state is indicated and recorded. The null-balancing instrument is preferred for plant use because of its high inherent operating stability over relatively long periods, however, the off-balance measuring embodiment possesses much higher sensitivity and thus may be advantageously utilized in laboratories or other locations where occasional check calibrations are not objectionable. Even the latter disadvantage may be largely overcome by employing an electrometer tube of a type wherein voltage changes on the grid do not substantially alter the operating characteristics of the tube over the measuring range involved.

The same general optical system may be utilized for both the null-balancing and off-balance measuring embodiments of this invention, and the optical principles of operation of both embodiments will be described with reference to Figure 1.

The light source indicated at 1 emits the light which is made to traverse the optical path through the light transparent sample cell and give an indication of the difference in refractive index between the sample material and the standard material. A monochromatic light source, such as a sodium arc, may be employed; in which case no light filter, such as the filter 6 hereinafter described, need be used to control the quality of the light. If measurements of differential refractive index are to be made over a relatively wide range, for example $\Delta n = 0.1$, with a required accuracy of only about 0.001, light filters may be dispensed with; if an ordinary tungsten filament incandescent lamp is used as the light source. Ordinarily, however, it is preferred to use a medium pressure mercury vapor lamp together with a suitable light filter for the reason that no means for light intensity regulation is then required and, furthermore, the average intensity of the light emitted is relatively constant over long periods of time.

Light filter 6 may be a conventional narrow band-pass type, or a filter passing a fairly wide band of light may be employed if an increased light intensity is desired. The purpose of filter 6 is to control the supply of light to within a more or less constant range of wave-lengths, so that light of substantially the same color will be reflected to each of the measuring phototubes hereinafter described, and thereby insure that the indication of the phototubes will be substantially independent of variations in light source quality. Filter 6 is preferably interposed in the light path ahead of sample cell 7 so that the filter will eliminate light which might heat up the sample or standard, or decompose the components.

The lens arrangement shown in Figure 1 is preferred, but it will be understood that this arrangement is susceptible of wide variations and in some cases some of the lenses may be dispensed with. As shown, the light emitted from source 1 is first preferably passed through condensing lens 2 which focuses the light on slit 3. Here the light is constricted to a moderately broad line after which it passes to collimating lens 4 which is preferably masked by diaphragm 5 to prevent undesired light leakage around the edges of this lens. The parallel beam of light next traverses filter 6 which permits the passage of light within the desired range of wavelengths and screens out the balance of the light. The parallel light beam emerging from filter 6 then passes into the sample cell 7, the entering window of which is disposed perpendicular to the direction of light travel so that the light beam will not be deflected from its course upon entering the sample material within the cell.

While both lenses 2 and 4 may be dispensed with, it is advantageous to employ them for the reason that they concentrate the light to a higher intensity and at the same time reduce stray light effects. If this desirable light control is not required, lens 2 can be eliminated without necessitating any changes in the other lenses of the system. If lens 4 is eliminated, lens 9 located after sample cell 7 must be chosen so that its focal length is such that it will still focus an image of slit 3 on the faces of the dividing mirror hereinafter described. At least one focusing lens, either 9 or 4, must be employed to form the image of slit 3, but either of these lenses may be eliminated if the focal length of the other is such that the image will still be formed at or near the plane defined by the dividing edge of the mirror and the axes of the phototubes.

Sample cell 7 encloses the sample material and the standard material, the differential refractive index value of which is to be determined. The standard material is preferably interposed as a light transparent prism 8 across the light path, while the liquid sample material is continuously circulated through the cell and around prism 8; it will be understood, however, that the positions of the two materials may be reversed so that the sample occupies the space inside the prism while the standard is circulated around the outside when desired. The vertex of prism 8 is disposed along a line parallel to light slit 3 with the walls of the prism oblique to the measuring light beam. It will be understood that prism 8 may be fabricated from any solid transparent material such as glass, properly oriented quartz, or a polymeric substance that has a refractive index such that it will serve as a standard of comparison for the sample material. Thus, if it is desired to maintain the sample material at a preselected composition which has a characteristic value of refractive index, prism 8 may be fabricated as a single piece from a material having the same characteristic refractive index. However, it is preferred to employ a hollow prism 8 which may be filled with a standard solution of any preselected value of refractive index, for the reason that a suitable standard is thereby more readily provided than in the former case where a solid prism is utilized. If a hollow prism 8 is employed, the light transparent prism windows may be fabricated from glass, preferably of the same composition and substantially the same thickness, so that no errors will be introduced into the determinations because of variance in this respect.

When the sample material and the standard material have the same or nearly the same composition, or, in any case, when the sample material and the standard material have the same or nearly the same refractive index and rate of change of refractive index with temperature, spurious refractions due to ambient temperature changes will be negligible for small values of $\Delta n$. To insure equality of the temperature of the sample material and the standard material it is preferred to house the entire assembly of analytical equipment within a light proof heavily insulated cabinet which is fitted with a suitable thermostat for close temperature control. The liquid sample material may be first brought to approximately the desired temperature level by circulation through an external temperature controller, and then to final temperature by passage through a heat transfer unit of sufficiently large heat capacity, such as a relatively long pipe coil, which is mounted within the equipment cabinet. It will be understood that under these conditions the sample cell temperature may be maintained at any desired level either above or below the level of the process temperatures maintained in the manufacturing system. Since the construction of the temperature regulation system is only indirectly related to this invention it has not been further described herein.

In the preferred case the light beam entering cell 7 traverses first the sample material and then the standard material; since the light enters the cell on a normal line, however, it will not be deflected from its course by the sample material. If the refractive index of the standard material of prism 8 is the same as that of the sample it will be apparent that the light beam will not be measurably deflected in transit through the prism and will emerge from the exit window of cell 7 along the same course at which it entered. If the refractive index of the sample material surrounding prism 8 is different from that of the standard material within the prism, the light beam will be deflected either up or down in the plane of Figure 1 an amount which is proportional to the difference and will emerge from cell 7 along a new path. The extent of this deflection is a measure of the differential refractive index value which it is the purpose of this device to determine.

After traversing cell 7 the light beam passes through focusing lens 9 hereinbefore described which converges the light to form an image of slit 3. The light then traverses glass plate 14, the function of which will be hereinafter described, and is brought to a focus at or near the plane defined by the sharp edge of dividing mirror 10 and the axes of the two phototubes.

Both the null-balancing and the off-balance measuring embodiments of this invention employ a dividing mirror 10 to effect a division of the measuring light beam so that a portion of the incident light is reflected to each of the phototubes 12 and 13. Dividing mirror 10 comprises a body portion having two faces inclined at equal angles on opposite sides of the dividing edge, which is disposed toward the light source. Small mirrors 10a and 10b are mounted on each of the faces so that light incident thereon is reflected to the phototubes. Phototubes 12 and 13 are conventional devices the internal resistance of which varies with the illumination received, so that the tubes pass small electrical currents which are proportional to the incident light reflected to them.

The optical elements described in the foregoing are of precisely the same construction in both the null-balancing and off-balance measuring embodiments of this invention; however, a different mirror mounting may be employed for each of the embodiments, and the details of these mountings will now be described.

In the null-balancing embodiment the supporting arm of dividing mirror 10 is threaded to receive micrometer screw 11, upon which it is mounted in non-rotatable relationship so that rotation of screw 11 moves mirror 10 either up or down in the plane of Figure 1. This mounting makes it possible to balance the amount of light which is reflected to each of the phototubes by moving mirror 10 by rotating screw 11 suitably in either a clockwise or counter-clockwise direction. The exact amount of deflection of the light beam at the point of light balance can be conveniently determined by providing a calibrated divided circle integral with screw 11 and a fixed index line on an adjacent surface, whereupon the movement of the dividing mirror to either side of the zero deflection mid-point may be ascertained by direct reading, if desired. As will be hereinafter described, this balancing operation is preferably effected by suitable automatic auxiliary devices which, at the same time, either give an indication or recording of the amount of the deflection, or actuate suitable control mechanisms to alter the composition of the sample material so that the deflection is restored to substantially zero. It will be apparent that a greatly increased range of deflection measurement may be attained by utilizing a movable dividing mirror of the nature employed in this embodiment, since deflections beyond the bounds of the mirror faces may be reflected by merely shifting the dividing mirror to a new position where the light beam will impinge upon these faces.

As distinguished from the null-balancing embodiment, the off-balance measuring embodiment of this invention may employ a dividing mirror 10 which is fixedly mounted at the approximate point where the center of an undeflected light beam will impinge. Where a liquid standard material is employed this point may be determined very precisely by filling both the cell and the prism with standard material, passing the light beam therethrough and ascertaining the center point of the beam by direct measurement. However, the final refined adjustment to the condition where equal amounts of light are reflected to both of the phototubes is preferably made by refracting the light a suitable degree in compensation by shifting it by the movement of glass plate 14 hereinafter described, or mounting the dividing mirror on a calibrated micrometer screw identical with screw 11 hereinbefore described, and then adjusting the mirror's position to the exact point corresponding to zero net deflection. Once the initial correction described has been made it will be understood that the position of the element used to effect this compensation is not thereafter altered until a new zero point setting is required. The instrument can be initially calibrated by passing a series of solutions having known compositions around prism 8 and measuring the degree of electrical off-balance which occurs in the circuit including phototubes 12 and 13 by employing conventional devices such as an indicating or recording voltmeter, for example. A plot of electrical off-balance versus compositions will then make it possible to determine the composition of any unknown samples which fall within the differential refractive index range encompassed by the calibration.

In both the null-balancing and off-balance measuring embodiments; the dividing edge of mirror 10 may be disposed in the same plane or a parallel plane to that of the slit image focused by lens 9, or may be slightly inclined to the vertical axis of the image by a small rotation in a plane perpendicular to the light beam so that, as changes in the differential refractive index value occur, the length of the slit image reflected to the phototubes varies. This inclination is particularly advantageous in the off-balance measuring embodiment where the position of the dividing mirror is fixed, because the light image is divided between the two mirror faces over a somewhat greater range of deflections than would be the case if the dividing edge were exactly parallel to the slit image, particularly where the width of slit 3 is relatively small, and the range of measurement is correspondingly increased. The amount of this inclination is preferably small, a 1½ to 2 degree rotation being employed for a light slit with a width of about 0.1 mm. Since a slight inclination of the dividing mirror edge to the axis of the slit image has a positive advantage under the conditions described, it will be apparent that in the null-balancing embodiment it is not necessary that the dividing mirror be at all times maintained exactly perpendicular to the light beam so long as it is prevented from cocking so that unequal amounts of light are thereby reflected to the phototubes. From the foregoing it will also be understood that precise focusing of lens 9 is not necessary to the proper functioning of the device.

Glass plate 14, interposed between lens 9 and dividing mirror 10, is a transparent plane parallel glass plate rotatably mounted upon a vertical shaft which is disposed out of the path of the light beam in prolongation with a line bisecting the undeflected light beam and parallel to the plane of slit 3. Plate 14 is preferably employed with each embodiment of this invention. It can, however, be made to serve a different purpose in each, and may be eliminated entirely if the functions it performs are not required.

When plate 14 is perpendicularly disposed across the light path it will not deflect the beam, but if the plate is rotated in a clockwise direction the light beam will be deflected downwardly in the plane of Figure 1 and, if the plate is rotated in a counter-clockwise direction it will deflect the light beam upwards. In the case of both embodiments plate 14 may be advantageously employed to train the measuring light beam at the precise zero point of the dividing mirror for the position chosen as the reference upon which subsequent determinations of $\Delta n$ are to be based. When this method of zero point selection is utilized it will be apparent that slight deviations of light which arise from the passage of the light through the several cell and prism windows will be compensated for without regard to their absolute magnitude. Using this method it is likewise possible to employ a standard material which possesses a refractive index appreciably different from the value at which it is desired to maintain the sample material, correcting for the initial difference between standard and sample; and thus greatly simplifying the selection of a suitable standard material. The described method of zero point selection is particularly important in the case of the off-balance measuring embodiment of this invention, because it does not necessitate changing the fixed mounting of the dividing mirror for a sample-standard system wherein the undeflected beam does not impinge exactly on the dividing edge of the mirror, the amount of this initial variance being compensated by deflecting the beam a suitable amount so that it will coincide with the dividing edge of the mirror. In the null-balancing embodiment the same initial zero point adjustment is desirable so that dividing mirror 10 will be disposed at the midlength of micrometer screw 11, and the base line of the screw's divided circle will be exactly opposite the fixed reference line. The null-balancing embodiment can, of course, be made to measure light deflections from some arbitrary base line corresponding to a different length of micrometer screw than the midlength, and the zero point setting obtained by varying the position of the dividing mirror either up or down until the output of reflected light to each phototube is equal; however, the use of a relatively thin plate 14 of the order of about 2 mm. thickness affords a more accurate way of obtaining this initial setting and is preferably utilized in this case as well. It will be understood that when plate 14 is used to effect the zero point adjustment it will be turned to the point where it brings the undeflected light beam from cell 7 to bear on the dividing edge of mirror 10 after which its setting will not be altered until the evaluation of a new sample-standard system makes it necessary to effect a different initial compensation. The supporting shaft of plate 14 may be provided with a divided circle and a fixed index point in the same manner as has been described for micrometer screw 11 to permit the direct determination of the setting of plate 14.

In the null-balancing embodiment of this invention, glass plate 14 may be used for an entirely different purpose than that hereinbefore described. In this embodiment electrical balance is achieved at each light deflection by altering the light output to each of the two phototubes so that equal amounts of light are reflected to each tube. As will hereinafter be described in greater detail this light balance may be effected by moving dividing mirror 10 to some new balance point by manipulation of micrometer screw 11. But, it will be apparent that the same effect may be secured by maintaining dividing mirror 10 in a fixed position and altering the position of plate 14 to new positions corresponding to balance at each of the varying light deflections. In this case it will be understood that plate 14 cannot at the same time be used for zero point adjustment but it is possible to vary the setting of dividing mirror 10 to achieve this adjustment. When used to determine light deflections, plate 14 may be advantageously fabricated of somewhat thicker glass than is utilized where the plate functions in a zero point adjustment capacity, since the degree of light deflection increases with thickness, and the range of detection is thereby correspondingly increased. In this case it may be desirable to utilize a plate of a thickness of about 6 mm. or even greater, but it will be understood that as the thickness of the plate increases the sensitivity of light beam deflection detection decreases, and the choice of plate thickness will depend upon the optimum balance of these factors.

Figure 2:
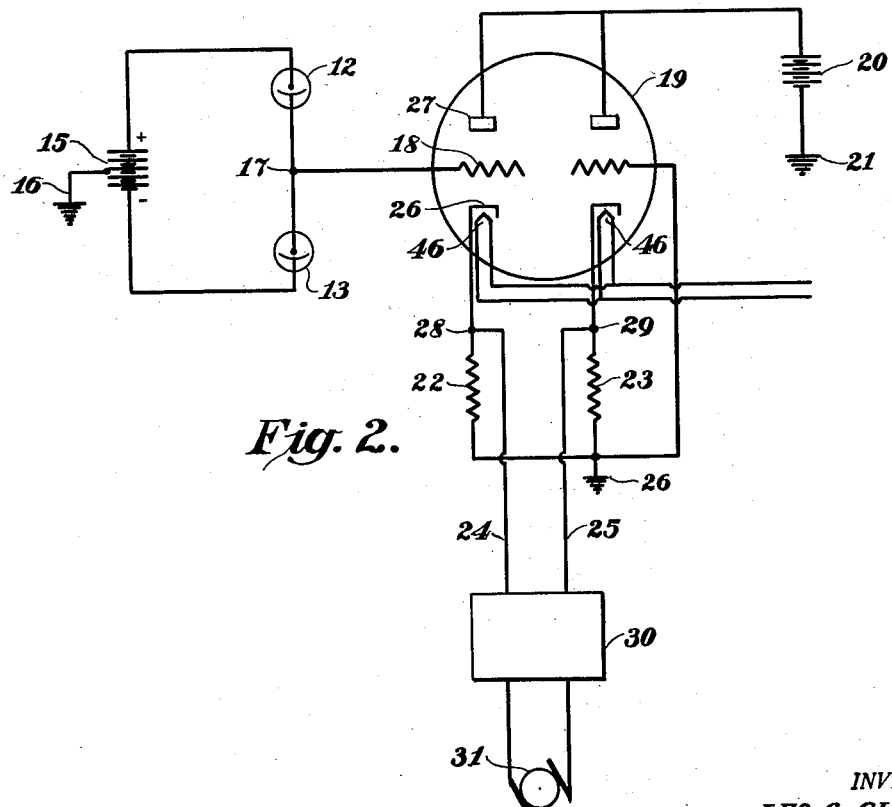
Figure 2 is a diagrammatic representation of the electrical circuit which is employed in conjunction with the optical system of Figure 1.

Referring to Figure 2, the complete electrical circuit utilized with this invention comprises a phototube circuit in combination with an electrometer circuit. The purpose of the phototube circuit is of course to detect changes in light balance which result from varying light deflections and emit a characteristic electrical signal for each of the several deflections. The purpose of the electrometer circuit is to receive the electrical signals from the phototube circuit without at the same time causing any interference with the phototube circuit's detection functioning. The same combination circuit is utilized with both the null-balancing and off-balance measuring embodiments, the only difference being that the output signal of the electrometer circuit is used to effect optical rebalance in the null-balancing embodiment while, in the case of the off-balance measuring embodiment, the output signal is passed to a conventional voltage recording device.

The phototube circuit comprises the two phototubes 12 and 13, the anode of one of which is connected to the cathode of the other while the remaining tube elements are connected to the terminals of battery 15, the midpoint of which is grounded at 16. As shown, each half of battery 15 constitutes one arm of a bridge circuit while phototubes 12 and 13 constitute the remaining two arms. This bridge circuit may properly be termed or designated as a series-aiding light responsive electrical circuit. When an equal amount of light is reflected to each of the phototubes the electrical potential at point 17 of the phototube circuit will be zero, if the sensitivity of the phototubes is equal.

Point 17 is connected to grid 18 of one triode section of the double triode electrometer tube 19. The electrometer circuit comprises electrometer tube 19, battery 20, equal resistances 22 and 23 and output leads 24 and 25. The two cathode elements of electrometer tube 19 are heated by resistance elements 46 in parallel connection which are supplied with current from a common outside source not shown.

As shown, both triode sections are supplied from a common voltage source 20 and both cathode elements are grounded at 26 through their respective resistors 22 and 23 so that the potential between points 28 and 29 will be zero, as long as the electrical potential of grid 18 remains at zero level. When one of the phototubes, for example 12 of Figure 2, receives more light than phototube 13 due to the deviation of the measuring light beam, a more positive electrical potential relative to ground is impressed upon both point 17 and grid 18, the grid current remaining almost zero in magnitude. Under these conditions a large electron current passes between cathode 26 and plate 27, and the potential of point 28 approaches that of plate 27; that is, it is highly positive with respect to point 29. Conversely, when phototube 13 receives more light than phototube 12, the grid potential changes to negative and the flow of electron current decreases proportionately, whereupon the potential at point 28 approaches that of ground and becomes negative relative to its condition when responsive to phototube 12, at the same time becoming negative with respect to point 29. In this connection, the right-hand triode section always provides a reference for comparison with the left-hand triode section, any potential difference across leads 24 and 25 being, for all practical purposes, solely the result of changes in potential at point 17 of the phototube circuit, regardless of the absolute potential level which may exist in the electrometer circuit due to slight changes in terminal voltage of battery 20 upon prolonged use, or from other causes. The double triode electrometer tube 19 performs its function of transforming the relatively weak input from the phototube circuit to an output at a higher power level without interfering with the functioning of the phototube circuit. The double triode construction is especially preferred because all elements are housed in a common envelope where changes in gas pressure and ambient temperatures will affect each section alike and thus prevent variations in operation which might result if the environments of the two triode sections were different. However, it will be understood that other types of electrometer tubes may be utilized, depending upon the particular tube characteristics which are desired.

As hereinbefore stated, the off-balance measuring embodiment of this invention utilizes a conventional recording voltmeter (not shown) to indicate variations in differential refractive index, the voltmeter being connected directly to leads 24 and 25.

The null-balancing embodiment necessitates the use of the additional conventional auxiliary equipment indicated generally at 30 in Figure 2 to restore the optical balance of the system upon each change in light deflection. Device 30 receives the direct current signal voltage from leads 24 and 25, converts this signal to alternating current of a phase relative to the alternating line current which is determined by the polarity of the input current, amplifies the resultant current and supplies this current to one winding of the brushless, reversible, variable speed, two phase induction motor 31. The other winding of motor 31 is continuously energized by ordinary 110 volt alternating current line voltage. Motor 31 responds to the signal current received from 30, rotating in one direction upon the reception of electric current of a phase corresponding to one polarity of signal from leads 24 and 25, and rotating in the opposite direction upon reception of electric current of a different phase corresponding to the opposite polarity.

Optical balance at each of the several light deflections corresponding to different values of differential refractive index is restored by coupling the shaft of motor 31 to micrometer screw 11 or to the rotatable shaft of plate 14, if it is desired to utilize the plate instead of the mirror to effect rebalancing. At the same time a recording of the amount of light deflection may be secured by mounting the movable center tap of a conventional helical type resistance upon either micrometer screw 11 or the rotatable shaft of plate 14, depending upon which device is utilized to restore optical balance, and connecting the two leads of this divided resistance in a circuit with a conventional automatic null-balancing recorder. With this arrangement the two divided portions of the helical resistance will function as two arms of a bridge circuit, the other two arms of which are an integral part of the recording device circuit. One of the resistance arms of the recorder is provided with a movable tap, the position of which is continuously altered to correspond with the position taken by the center tap of the helical resistance, the bridge circuit of which these elements are part being continuously balanced by null-balancing electrical means which are an integral part of the recorder mechanism. The electric motor which restores electrical balance in the bridge circuit described actuates the recorder pen, the position of which varies in accordance with the position of the center tap of the helical resistance, thereby tracing a record of both the amount and the direction of light deflection. The indication of the recording device is interpreted in terms of refractive index by prior empirical calibration using various liquid of known refractive index as standards.

The recording device utilized in conjunction with this invention may be of a conventional type which accomplishes a control function in addition to its recording function, under which conditions it may control the opening or closing of a regulating valve in a process line to introduce more or less of one of the chemical components to thereby restore the composition to an analysis which is within the preselected range of differential refractive index values.

The detailed construction of the various elements of equipment utilized with the refractometer of this invention may be varied widely; but elements designed as hereinafter described have proved entirely suitable for the purposes contemplated.

Figure 21:
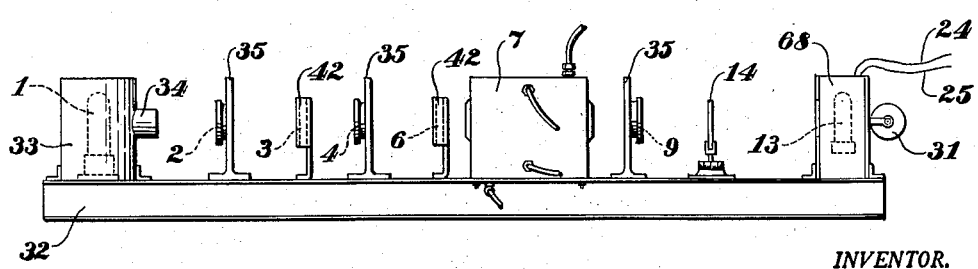
Figure 21 is a side elevation view of one assembly of apparatus which can be utilized to measure differential refractive index values according to this invention.

As indicated in Figure 21 all equipment may be conveniently mounted on a common base member 32 which may be a metal I-beam section, the top surface of which is accurately machined so that all elements are disposed in the same plane. The various elements are arranged in a straight line and are secured to 32 with suitable screws or bolts. The entire assemblage of equipment shown in Figure 21 is preferably housed in an insulated air-conditioned cabinet (not shown) fitted with conventional thermostatic controls so that the ambient temperature may be maintained substantially constant within about 0.1° C.

The light source is preferably housed in a metal light tight jacket 33 which is provided with a single light opening tube 34 oriented along the longitudinal axis of base 32.

Figure 5:
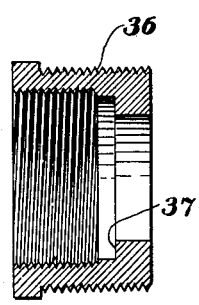
Figure 5 is a sectional view of a lens retaining holder.
Figure 6:
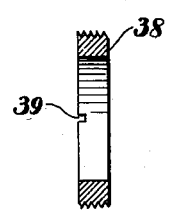
Figure 6 is a sectional view of a lens ring.
Figure 7:
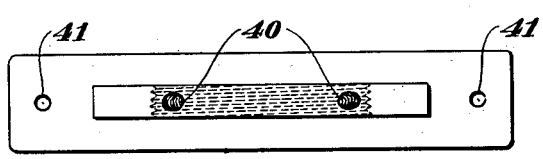
Figure 7 is a top plan view of a lens supporting bracket.
Figure 8:
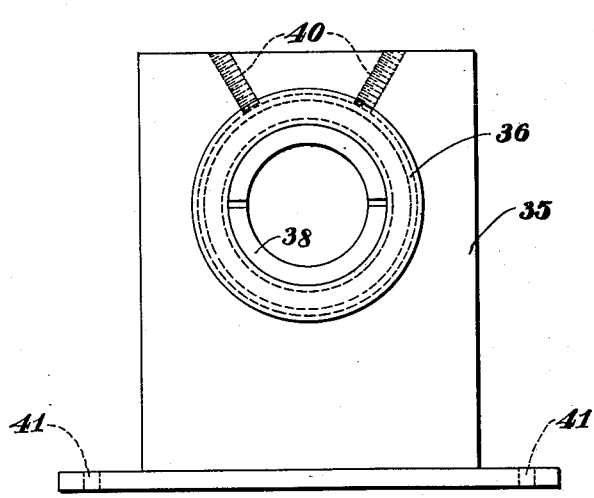
Figure 8 is a front view of the lens supporting bracket shown in plan in Figure 7.

Lenses 2, 4, and 9 are mounted on individual supporting frames 35 of the design illustrated in Figures 7 and 8. These lenses may be of ordinary spectacle glass quality preferably supported within annular threaded holders 36 (refer Fig. 5) with their forward faces contacting shoulders 37. The lenses are retained in position by annular threaded rings 38 (refer Fig. 6) which are adapted to engage with the internal threaded portions of holders 36. Rings 38 are provided with two slots 39 oppositely disposed to facilitate screwed assembly with holders 36. Suitable resilient gaskets may be interposed between the lenses and the metal surfaces of the holders and rings to cushion the lenses against breakage. Supporting frames 35 are tapped at points 40 to receive set screws which retain the lenses in a fixed position, and the base portion is provided with holes 41 for the reception of the screws which connect the frames to base member 32.

Figure 3:
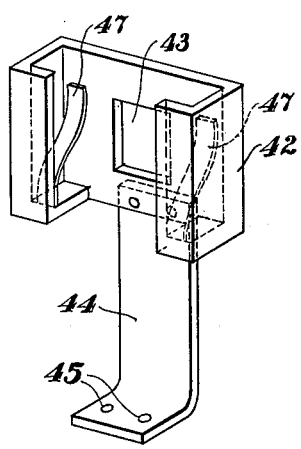
Figure 3 is a perspective view of one type of holder used for the support of a light filter or light slit plate.

Holders 42 (refer Figure 3) used to support slit plate 3 and filter 6, comprise a slotted plate receiving head portion, provided with a cut out window 43, which is supported by the standard 44, the foot of which is provided at 45 with screw openings for attachment to base member 32. The slots on each side of the holder are closed off at the bottom to provide supporting ledges upon which the lower edge of the slit plate or light filter rest, and spring clips 47 retain these elements in fixed position parallel to and against the wall containing window 43.

Figure 4:
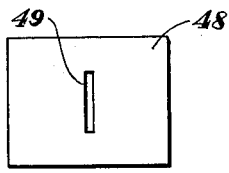
Figure 4 is a front view of one type of light slit plate which may be used with this invention.

The particular slit plate 48 shown in Figure 4 comprises a thin plate of light impenetrable material, such as metal, which is provided with a ruled perpendicularly disposed light opening 49 which may vary in width from about 0.1 mm. to as much as about 7.0 mm., or even greater, depending upon the width of mirror faces 10a and 10b. If relatively wide mirror faces are employed it will be apparent that a wide light slit may be utilized, so long as the entire expanse of mirror surface is not covered by the impinging light beam at any one time. It will be understood that it is advantageous to employ a relatively wide light slit, because slight dimensional variations caused by inaccuracies in machining, springing of the plate or obstruction by minute dust or lint particles will then only cause a very small percentage variation in light throughput, thereby preventing errors in determination arising from large inequalities in the light supplied to the mirror faces. Solid slit plates made from glass coated with vaporized metal at all points except the slit are especially suitable because they contain no aperture within which dust can accumulate. Also, the slit may be defined by two separate metal pieces, the true edges of which are arranged in opposition, such as by a pair of safety razor blades, if preferred.

Figure 9:
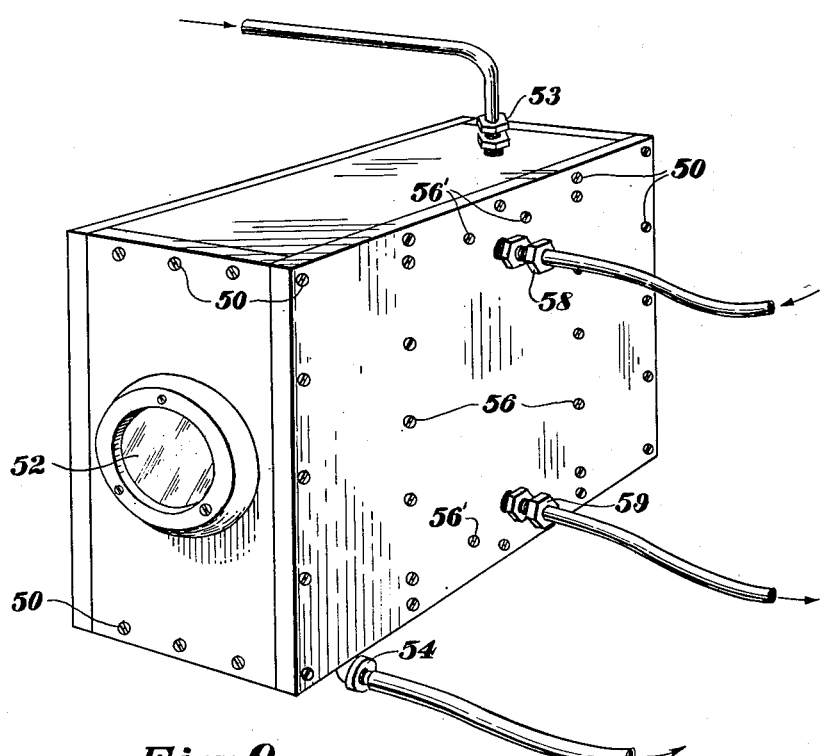
Figure 9 is a perspective view of one type of sample cell, showing the arrangement of connections for the supply and removal of the sample and standard liquids.
Figure 10:
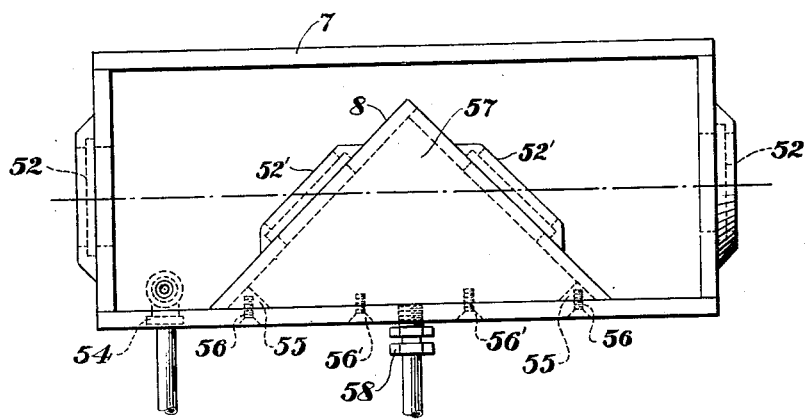
Figure 10 is a top plan view of the sample cell of Figure 9 with the cover plate removed.
Figure 11:
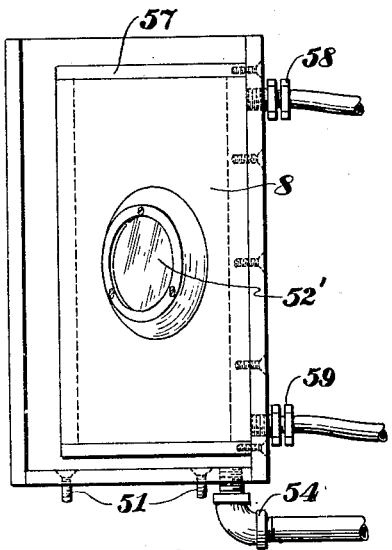
Figure 11 is an end view of the sample cell of Figure 10 with both the end and top cover plates removed.

Sample cell 7 shown in Figures 9, 10, and 11, comprises a completely enclosed chamber which may be fabricated from a series of metal plates assembled together with screws 50. The cell may be connected to base member 32 with screws 51 which are introduced from the inside of the chamber through counter-sunk holes drilled in the bottom plate. Cell 7 is provided with transparent glass light inlet and outlet windows 52 disposed at the level of the measuring light beam. It will be understood that sample cell 7 may be widely varied in design and may even conveniently constitute a section of process piping. As shown, the liquid sample material is introduced into cell 7 through pipe coupling 53 and is removed on the opposite side of the chamber through pipe coupling 54.

A hollow standard prism 8 is illustrated in the drawings, it being understood that a solid prism of suitable material may be substituted if preferred. As shown, prism 8 is disposed in the path of the measuring light beam, with the vertex edge parallel to light slit 49, the two metal sides being welded together at an angle of 90°. The two sides are provided at their base ends with welded fillet strips 55 which are tapped to receive screws 56 securing the prism to the cell side wall, which at the same time serves as the prism base. The ends of the prism are sealed by triangular plates 57, which are secured to the prism sides by welding so that the prism is leak tight. Screws 56' secure the end plates to the side wall. A suitable gasket may be interposed between the prism and the cell wall to insure a leak tight seal at this point. Each of the prism sides is provided with a window 52' disposed at the same level as windows 52 hereinabove described and of the same design. The prism construction described has several important advantages, since it will be apparent that this design permits ready disassembly for purposes of cleaning or inspection and fillets 55 close off the spaces along the base edges so that material cannot collect at these points and thereby change the composition of the standard material. The liquid standard solution is introduced into prism 8 through pipe coupling 58 and may be withdrawn through pipe coupling 59 whenever a change in standard is required.

Figures 12, 13:
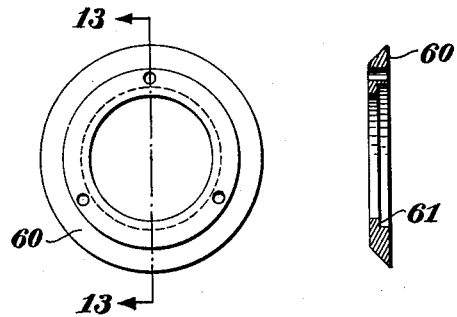
Figure 12 is a front elevation view of a cell or prism window retaining ring.
Figure 13 is a sectional view taken along line 13—13 of Figure 12.

The window glasses of both cell 7 and prism 8 are strong, circular pieces of plane glass which are retained in place by annular rings 60 (refer Figs. 12 and 13) which are held in place by three screws disposed equidistantly around the peripheries. The window plates are inserted against the annular shoulder portions 61, suitable resilient gaskets being interposed on both sides of the glass to protect against breakage during assembly.

As hereinbefore stated the refractive index characteristic of a material varies with temperature. Temperature control according to this invention is achieved by maintaining both the sample material and the standard material at substantially the same constant temperature level, which is facilitated by utilizing the common cell construction above described. The sample material is continuously circulated through the cell chamber from a thermostatically controlled, large capacity reservoir of the type hereinbefore generally described. The standard material is preferably not circulated but is retained within the confines of the hollow prism where its temperature is maintained at the same level as that of the sample material.

Figure 14:
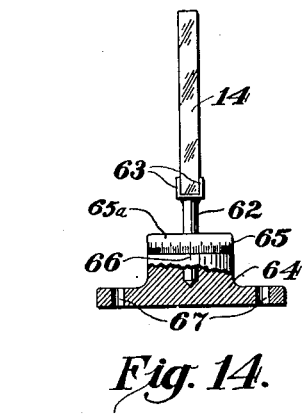
Figure 14 is a side elevation view in partial section of a rotatable glass plate holder.

The design of glass plate 14 shown in Figure 14 is particularly suited to zero point adjustment in the manner hereinbefore described. The glass plate is supported by vertical shaft 62, provided at its upper end with clevis arms 63 between which the glass plate is inserted and firmly held in place by set screws or an adhesive material. The lower end of shaft 62 is tapered to a bearing point which is seated in a complementary bearing portion of base 64 so that the shaft and its associated glass plate may be freely turned in a horizontal plane about the bearing center as a pivot. Shaft 62 is provided with a fixedly attached divided circle 65, the degree of angular displacement being determined from calibration 65a by reading the rotation past base line 66 which is inscribed at the top of base 64. Drilled holes 67 are provided in base 64 for the reception of connecting screws joining plate 14 to base 32. When plate 14 is to be used to effect optical rebalancing it will be understood that shaft 62 may be provided with a gear wheel or other means (not shown) for driving connection with the output shaft of motor 31, and the plate will then automatically assume such a position that the measuring light beam will be restored to its initial position along the edge of mirror 10 for each separate value of differential refractive index.

Figure 15:
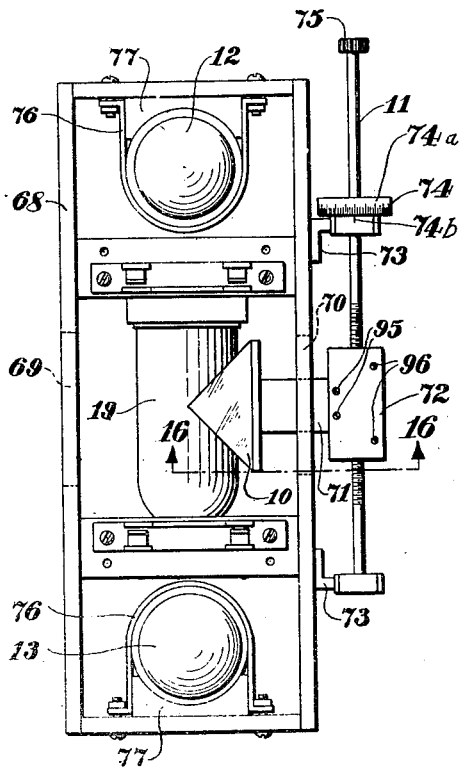
Figure 15 is a top plan view of a chamber housing the dividing mirror, the light measuring phototubes and the electrometer tube, with the top cover plate removed, the light shutter element and all electrical connections being omitted for clarity in representation.
Figure 17:
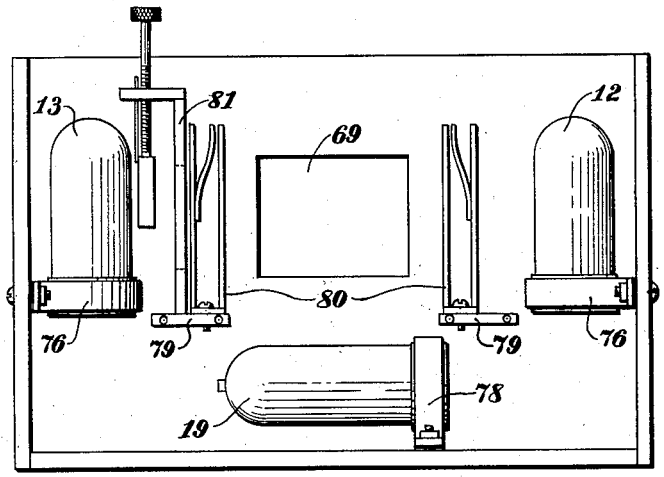
Figure 17 is a rear elevation view of the chamber shown in Figure 15 with both top and back cover plates removed and the light shutter element assembled, the electrical connections being omitted.

Phototubes 12 and 13, and electrometer tube 19, are enclosed in chamber 68 (refer Figs. 15 and 17), the front side wall of which is provided with cut out light window 69. The rear wall of chamber 68 is slotted at 70 to provide clearance for the travel of the mirror's supporting arm 71 which is integrally joined to advancing nut 72 threaded to micrometer screw 11. Bracket members 73 provide bearing support for the unthreaded ends of screw 11 which carries integral divided circle 74 for the direct measurement of mirror deflection, by means of calibrations 74a and 74b thereon. Gear wheel 75 attached to screw 11 is adapted to engage with a companion gear on the output shaft of motor 31.

Figure 18:
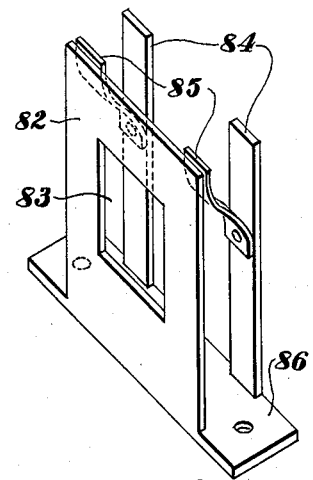
Figure 18 is a perspective view of one type of diffusing plate holder.

Phototubes 12 and 13 are mounted upon the chamber walls at a common level and are retained in place by clamps 76 and pillow blocks 77. Electrometer tube 19 is secured to the base of the chamber by clamps 78. Shelf members 79 support diffusing plate holders indicated generally at 80, shown in detail in Figure 18, and also support the light shutter indicated generally at 81.

Diffusing plate holders 80 comprise a front wall 82 provided with a cut out light window 83 and rear upright strips 84 carrying spring clips 85, all supported by a base plate 86 which is drilled at each end to permit screw mounting upon shelf members 79. The plate holders support conventional ground glass diffusing plates which are utilized to disperse the light reflected from dividing mirror 10 evenly over the light sensitive area of the phototubes, thereby, to some degree, balancing out the effect of any point inequalities in phototube element sensitivity.

Figure 19:
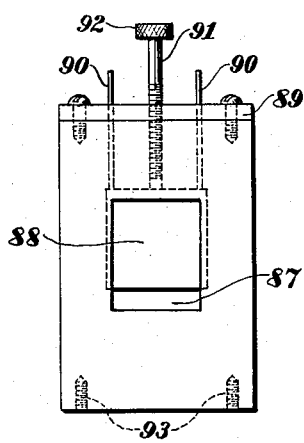
Figure 19 is a front elevation view of one type of light regulating shutter.
Figure 20:
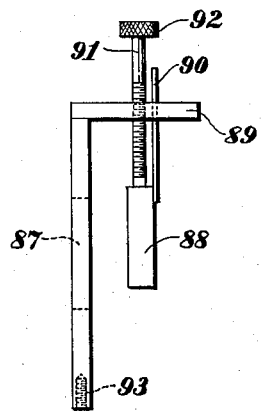
Figure 20 is a side elevation view of the shutter shown in Figure 19.

Light shutter 81 (refer Figs. 19 and 20) comprises a vertical face plate provided with a cut out light window 87, the opening area of which may be adjusted by means of light impenetrable plate member 88 which is supported from top shelf 89. Guide shafts 90 are welded to the top corners of plate 88 and slide freely through companion holes in shelf 89. Plate 88 is supported by adjusting screw 91 connected therewith by a slip collar or other means permitting free rotation of the screw with respect to the plate. Screw 91 is threadedly supported by shelf 89, so that the elevation of the plate may be varied by turning knurled head 92 of screw 91 in one direction or the other. The bottom edge of the face plate is tapped at points 93 to permit screw connection with shelves 79.

Light shutter 81 affords a novel means for adjusting the sensitivities of the two phototubes so that they are substantially equal. A pair of phototubes will rarely have the same inherent sensitivity and, since the refractometer of this invention functions by virtue of balanced reflected light, it will be apparent that the light response of the stronger phototube must be reduced to the level of the weaker phototube so that the responses of both tubes will be equal when the dividing mirror reflects equal quantities of light to each of the tubes.

A convenient method for achieving this initial sensitivity balance is to employ one of the phototubes to be used to determine the zero point position of the dividing mirror when sample cell 7 and prism 8 both contain only standard material, under which conditions it will be understood that the measuring light beam is not deflected. The leads of the single phototube may be connected to a sensitive galvanometer and readings taken with the phototube mounted on first one side of the dividing mirror and then on the other. The position of the dividing mirror may then be shifted in one direction or the other until the phototube response, as indicated by the galvanometer reading, is exactly the same when the phototube is mounted on either side of the mirror. The other phototube to be used may then be mounted on the opposite side of the dividing mirror from the first phototube without altering the position of the dividing mirror from its balanced setting. The stronger phototube is masked by mounting shutter 81 before it and turning down screw 91 and its connected plate 88 until the light responses of both tubes are exactly the same, as indicated by equal galvanometer readings across the terminals of each tube. The electrical circuit may then be connected in the manner shown in Figure 2, whereupon the instrument is in condition for use. It will usually not be necessary to again alter the shutter setting until long periods of use have caused marked changes in the inherent sensitivity of the tubes.

Dividing mirror 10 may be a glass prism, the two faces of which are silvered to provide mirror surfaces 10a and 10b, or the mirror surfaces may be highly polished metal plates. In either case it is preferred to utilize a relatively sharp vertex edge so that precise division of the measuring light beam may be effected.

Figure 16:
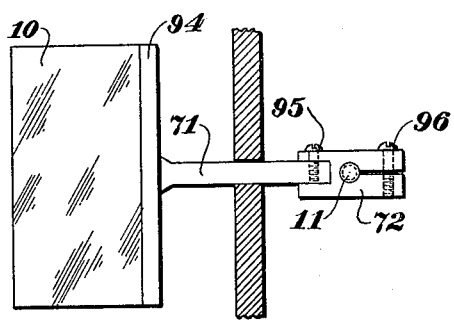
Figure 16 is a partial section taken along line 16—16 of Figure 15.

Referring to Figure 16, the dividing mirror may be conveniently mounted with an adhesive cement upon plate member 94 which is integrally joined to supporting arm 71. The rear wall of chamber 68 is provided with slot 70 to permit the passage of arm 71 therethrough, the mating surfaces of the slot and the arm being accurately machined so that the slot surfaces serve as guiding ways for the horizontal travel of the support arm, while at the same time restraining the arm against vertical movement. The outer end of support arm 71 is seated in an accurately machined keyway slot in advancing nut 72 in abutting relation to the bottom of the slot and is retained against movement by two screws 95 located along the opposite edges. Advancing nut 72 is preferably split so that its tension against the threads of screw 11 may be adjusted by tightening screws 96 to compensate for wear over long periods of service.

In practice, differential refractometers constructed according to this invention have possessed a high sensitivity.

In one case the null-balancing embodiment was utilized to check the concentration of alcohol in water solution in the range of 0 to 1.0% alcohol by volume, using pure water as the standard material in the hollow prism. At 29.45° C., $n_{H_2O}=1.33200$ while $n_{Eth}=1.35662$. A 1% by volume alcohol-water solution has a refractive index value of 1.33242, the difference in refractive index, $\Delta n$, from pure water to 1% alcohol concentration being 0.00042, corresponding to a movement of the mirror's dividing edge of 0.025 inch. The micrometer screw utilized moved the mirror 0.0001 inch for each degree of rotation of the screw. In this range the relation between alcohol concentration and refractive index is nearly linear, so that a 0.1% alcohol solution had a refractive index value of 1.33204, corresponding to a movement of the mirror's dividing edge of 0.0025 inch. Using the helical resistance hereinbefore described to actuate the recording device, $\Delta n$ values of the order of 0.000004, corresponding to 0.01% alcohol concentration, could be detected with very close control of the temperature of the sample and standard materials. When the temperatures of the sample and standard materials are maintained constant within a range of 0.1° C., alcohol concentration changes of the order of about 0.03% by volume may be detected. With the recording instrument employed in these measurements it was necessary to preset the range to within the limits of 0 to 4% alcohol concentration by volume, corresponding to a range of refractive index change of 0.0013; but, it will be understood that it is possible to increase the range of indication substantially by increasing the scale span of the recording instrument utilized by conventional methods known in the art.

In practice, a wide variety of sample cell designs may be utilized for the comparison of the selected standard material with the sample to be tested, the only common requirement in all cases being that one of the materials to be compared must be interposed oblique to the measuring light beam. While it is generally preferred that the light enter the sample cell normally, in some cases it may be advantageous to utilize a design comprising a main hollow outer prism for containing the sample and a second smaller standard-containing prism mounted inside the first with its sides and base parallel to the sides and base of the main prism. In this case it will be understood that the initial light deflection will be much greater than in the case where the light enters normally; however, the instrument will still comprise a differential refractometer within the meaning of the term as herein used. It will also be understood that the sample cell may simply comprise a two-part, light transparent container wherein the common wall separating the sample material from the standard material is disposed obliquely across the light beam path. As a practical matter the oblique separation between sample and standard must be limited to an angle of about 15 degrees to about 85 degrees with the path of the light arriving from the source to secure detectable deviations of the measuring light in its traverse through the cell.

When a prism is used as a chamber for one of the components to be compared it is not necessary that the prism be of isosceles form with both sides of equal length, although the latter construction is generally preferred.

It will also be understood that the light emerging from the sample cell may be divided in other ways than by the dividing mirror construction which has been described. Thus, it is possible to split the light into two portions by the use of a light impenetrable plate disposed in a plane parallel to the line of light travel and then measure the quantities of light by direct impingement on phototubes located on each side of the plate. Or the splitting plate may be provided with reflecting surfaces operable to register the light on detecting phototubes located at other points.

Where a dividing mirror is used to separate the emergent light, the micrometer screw may be housed within the chamber in which the phototubes and electrometer tube are mounted, and the extent of mirror movement indicated by a movable index scale supported upon guiding ways mounted within the slot in the rear wall, all in a manner well known in the art and therefore not further described herein.

It will be apparent that this invention is capable of variation and wide modification within its essential spirit, wherefore I intend to be limited only to the extent indicated by the scope of the following patent claims.

What is claimed is:

1. A differential refractometer comprising the combination of a light source, a condensing lens, a restrictive light slit, a collimating lens, a light filter passing only light substantially continuous in intensity with wave length, a sample chamber disposed normal to the light path and provided with a space for one of the liquid materials to be compared and with a hollow prism disposed with its vertex parallel to the plane containing said restricting slit and its sides oblique to the light path for containing the second liquid material to be compared, a second condensing lens, a sharp-edged dividing mirror movably mounted in the plane of light deflection for splitting the once-refracted emergent light from said sample chamber into separate portions, and electrical means for measuring the ratio of the amount of said once-refracted light in each of said portions, and for moving said dividing mirror to a new position where the separate light portions are equalized, thereby indicating the amount of deflection of said once-refracted light.

2. A differential refractometer according to claim 1 wherein the means for measuring the ratio of light in the separate portions comprises two phototubes connected in series-aiding relationship, a first powered circuit having a control element connected to a point between said phototubes, said first circuit passing current of a magnitude dependent upon the electrical potential of the point of connection of said control element between said phototubes, a second powered circuit connected in parallel relationship to said first powered circuit passing current independent of potential variations of the point of connection of said control element between said phototubes, means for amplifying and transposing the net output of said powered circuits to an electrical signal of a phase determined by the electrical potential existing between said phototubes, and means responsive to said electrical signal for moving said dividing mirror to a new position where the light portions are equalized and for giving an indication of the amount of deflection of said once-refracted light.

3. A differential refractometer comprising the combination of a light source, a condensing lens, a restrictive light slit, a collimating lens, a light filter passing only light substantially continuous in intensity with wave length, a sample chamber disposed normal to the light path and provided with a space for one of the liquid materials to be compared and with a hollow prism disposed with its vertex parallel to the plane containing said restrictive slit and its sides oblique to the light path for containing the second liquid material to be compared, a second condensing lens, a sharp-edged dividing mirror movably mounted in the plane of light deflection for splitting the once-refracted emergent light from said sample chamber into separate portions, separate phototubes mounted to receive said light portions, and means responsive to the degree and kind of electrical unbalance between said phototubes to move said dividing mirror to a new position where the separate light portions are equalized, thereby indicating the amount of deflection of said once-refracted light.

4. A differential refractometer comprising in combination, a light source, a condensing lens, a restrictive light slit, a collimating lens, a light filter passing only light substantially continuous in intensity with wave length, a sample chamber disposed normal to the light path and provided with a space for one of the liquid materials to be compared and with a hollow prism disposed with its vertex parallel to the plane containing said restrictive slit and its sides oblique to the light path for containing the second liquid material to be compared, a second condensing lens, a pair of phototubes connected in series-aiding relationship, a sharp-edged dividing mirror movably mounted in the plane of light deflection for splitting the once-refracted emergent light from said sample chamber into separate portions and for reflecting each of said portions to one of the pair of phototubes of substantially equal light sensitivity, a first powered circuit having a control element connected to a point between said phototubes, said first circuit passing current of a magnitude dependent upon the electrical potential of the point of connection of said control element between said phototubes, a second powered circuit connected in parallel relationship to said first powered circuit passing current independent of potential variations of the point of connection of said control element between said phototubes, an electrical signal of a phase determined by the electrical potential existing between said phototubes, means for amplifying and transposing the net output of said powered circuits to said electrical signal, and means responsive to said electrical signal for moving said dividing mirror to a new position where the light portions are equalized and for giving an indication of the deflection of said light beam convertible to difference in refractive index.

5. In a device for transforming changes of refractive index of a fluid into electrical indications of said changes including means for producing a light beam, which comprises in combination, a light source, a slit for constricting the light to a broad line, a collimating lens through which the light beam is passed, a filter traversing the light beam to render it substantially continuous in intensity with wave length, a cell through which the light is passed and having a window perpendicular to the direction of light travel to eliminate deflection of the light beam from its course, separate phototubes and means for measuring the amount of refraction comprising a dividing mirror having a sharp edge to split the light beam and deflect separate portions of it to each of said tubes, a lens and a glass plate through which the light beam is passed to bring it into focus approximately at the plane defined by the sharp edge of said mirror and the axes of the phototubes to deflect the light to said phototubes, and means for determining the ratio of light intensities in the two split portions of the light beam by measuring the ratios of responses of said phototubes to thereby indicate the amount of light refraction.

6. In a device for transforming changes of refractive index of a fluid into electrical indications of said changes including means for producing a light beam, which comprises in combination, a light source, a slit for constricting the light to a broad line, a collimating lens through which the light beam is passed, a filter traversing the light beam to render it substantially continuous in intensity with wave length, a cell through which the light is passed and having a window perpendicular to the direction of light travel to eliminate deflection of the light beam from its course, separate phototubes and means for measuring the amount of refraction comprising a dividing mirror having a sharp edge to split the light beam and deflect separate portions of it to each of said tubes, a lens and means comprising a rotatable, plane-parallel, transparent plate interposed across the light path before the dividing mirror to deflect the light a predetermined amount by passage therethrough to initially center the refracted emergent light at the zero point of equal light reflection.

7. In a differential refractometer, means for producing a refracted light beam which is substantially continuous in intensity with wave length, which comprises in combination, a first body of liquid to be compared, a second body of liquid to be compared disposed contiguous to said first body, a restricting slit for said light beam, means for passing the light through said slit and thence normally through the first body of liquid and obliquely through said second body of liquid, a dividing mirror having a sharp leading edge for splitting the light beam by focusing the refracted emergent light upon said leading edge, a pair of separate phototubes of substantially equal light sensitivity and means for reflecting separate portions of said light to each of said tubes, actuating auxiliary means responsive to the ratio of the portions of said light reflected to each of said phototubes to move the dividing mirror to a new position to equalize the light portions reflected by said mirror, and indicate the amount of light deflection by measuring the amount of mirror movement.

8. In a differential refractometer including means for producing a refracted light beam substantially continuous in intensity with wave length, which comprises in combination, a light source, a slit for constricting the light to a broad line, a refraction cell and a focusing lens through which the light is passed and having a window perpendicular to the direction of light travel to eliminate deflection of the light beam from its course, a dividing mirror having a sharp edge for splitting the light beam by focusing the emergent light of said beam upon said sharp edge, means for measuring the ratio of intensities in split portions comprising, two separately mounted phototubes of substantially equal light sensitivity, said dividing mirror reflecting separate portions of said refracted light from the faces of said mirror to each of said separate phototubes, a movable, plane-parallel transparent plate interposed across the path of said light beam between the focusing means and said dividing mirror, actuating auxiliary means responsive to the electrical unbalance between said phototubes to rotate said transparent plate to a new position to equalize the light portions reflected by said mirror, and means measuring the amount of plate movement to create an indication of the light deflection.

9. In a differential refractometer, the combination comprising a light source, a restricting slit, a focusing lens, a light filter passing only light substantially continuous in intensity with wave length, a sample chamber disposed normal to the light path and provided with a space for liquid sample material and a second contiguous space for standard material, said spaces being separated along a line oblique to the light path and disposed at an angle of between about 15 degrees and about 85 degrees therefrom, a sharp-edged mirror for dividing the refracted emergent light from said sample chamber into separate portions, and means for measuring the ratio of the amount of said light in each of said portions to thereby determine the degree of light deflection comprising a tilt plate in combination with phototubes connected in series-aiding relationship, a first powered circuit having a control element connected to a point between said phototubes, said first circuit passing current of a magnitude dependent upon the electrical potential of the point of connection of said control element between said phototubes, a second powered circuit connected in parallel relationship to said first powered circuit passing current independent of potential variations of the point of connection of said control element between said phototubes, and means responsive to the difference in the electrical outputs of said two powered circuits to register the degree of deflection of said refracted light.

10. A differential refractometer comprising the combination of a light source, a vertically disposed light restricting slit, a focusing lens, a light filter passing only light substantially continuous in intensity with wave length, a sample chamber disposed normal to the light path and provided with a space for one of the liquid materials to be compared and with a hollow prism disposed with its vertex parallel to the vertical edges of said restricting slit and its sides oblique to the light path for containing the second liquid material to be compared, means for dividing the refracted emergent light from said sample chamber into separate portions, comprising a sharp-edged mirror having a pair of inclined reflecting faces, and means for measuring the ratio of the amount of light in each of said portions to thereby determine the degree of deflection of said refracted light.

LEO G. GLASSER.

REFERENCES CITED

The following references are of record in the file of this patent:

UNITED STATES PATENTS

| Number | Name | Date |
| --- | --- | --- |
| 1,905,251 | Styer | Apr. 25, 1933 |
| 2,114,867 | Wilson | Apr. 19, 1938 |
| 2,136,682 | Gilbert | Nov. 15, 1938 |
| 2,139,474 | Shepard | Dec. 6, 1938 |
| 2,385,503 | Glasser | Sept. 25, 1945 |
| 2,413,208 | Barnes | Dec. 24, 1946 |
| 2,427,996 | Seaman | Sept. 23, 1947 |
| 2,445,044 | Stamm et al. | July 13, 1948 |
| 2,483,102 | Pierson | Sept. 27, 1949 |